United States Patent
Munding et al.

(10) Patent No.: US 6,519,928 B2
(45) Date of Patent: Feb. 18, 2003

(54) PROCESS FOR THE PRODUCTION OF A TRANSVERSE THRUST IN A FLYING OBJECT

(75) Inventors: German Munding, Bad Friedrichshall (DE); Wolfgang Müller, Möckmühl (DE); Joachim Reinecke, Taufkirchen (DE); Peter Gleich, Abensberg (DE)

(73) Assignee: Strium GmbH, Munich (DE)

( * ) Notice: Subject to any disclaimer, the term of this patent is extended or adjusted under 35 U.S.C. 154(b) by 26 days.

(21) Appl. No.: 09/843,155

(22) Filed: Apr. 26, 2001

(65) Prior Publication Data

US 2001/0049935 A1 Dec. 13, 2001

Related U.S. Application Data

(63) Continuation-in-part of application No. 09/271,400, filed on Mar. 17, 1999, now abandoned.

(30) Foreign Application Priority Data

Mar. 26, 1998 (DE) ......................................... 198 13 330

(51) Int. Cl.$^7$ ................................................. C06D 5/04
(52) U.S. Cl. ............................. 60/218; 60/204; 60/205; 60/258
(58) Field of Search ...................... 60/218, 204, 205, 60/258

(56) References Cited

U.S. PATENT DOCUMENTS

| | | | |
|---|---|---|---|
| 3,772,885 A | 11/1973 | Munding | 60/207 |
| 3,956,885 A | 5/1976 | Davis et al. | 60/39.46 |
| 4,583,361 A | 4/1986 | Genovese | 60/39.462 |
| 6,272,846 B1 * | 8/2001 | Schneider | 60/218 |
| 6,272,847 B1 * | 8/2001 | Dietrich | 60/258 |
| 6,286,304 B1 * | 9/2001 | Back et al. | 60/202 |
| 6,314,718 B1 * | 11/2001 | Schneider | 60/218 |

FOREIGN PATENT DOCUMENTS

| | | |
|---|---|---|
| DE | 2537543 | 3/1976 |
| DE | 3616184 | 2/1987 |
| EP | 0522270 | 1/1993 |

\* cited by examiner

*Primary Examiner*—Charles G. Freay
*Assistant Examiner*—William H. Rodriguez
(74) *Attorney, Agent, or Firm*—Ladas & Parry

(57) ABSTRACT

A process for the production of a transverse thrust in a flying object in which a defined quantity of a monergol propellant substance is introduced into a propulsion unit, which is arranged transversely relative to a longitudinal axis of the flying object to produce a thrust transverse to the longitudinal axis of the flying object. The propulsion unit has a combustion chamber, a supersonic nozzle connected to the combustion chamber and a source of heat to combust the propellant substance and produce the desired thrust for a prescribed time. The monergol propellant substance, introduced tangentially into the combustion chamber to form a film of the propellant substance on an inside surface of a wall of the combustion chamber; and the film of propellant substance on the wall is combusted by a pyrotechnic source of heat arranged in the wall of the combustion chamber in the vicinity of a throat of the supersonic nozzle to produce hot gases by the combustion of the propellant substance and transverse thrust in the supersonic nozzle. An automatically operated non-return valve without moving parts prevents backflow of combustion gases to the inlet valve.

12 Claims, 2 Drawing Sheets

PROCESS FOR THE PRODUCTION OF A TRANSVERSE THRUST IN A FLYING OBJECT

CROSS-RELATED APPLICATION

This application is a continuation-in-part of Ser. No. 09/271,400 filed Mar. 17, 1999, (now, abandoned).

FIELD OF THE INVENTION

The present invention relates to a process for the production of a transverse thrust in a flying object in which a defined quantity of a monergol propellent substance is introduced into a propulsion unit, which is arranged transversely relative to the longitudinal axis of the flying object, together with a supersonic nozzle and the monergol substance is combusted by means of a source of heat in order to produce the desired thrust for a prescribed time.

BACKGROUND

Such a process serves, in particular, for correcting the position and path of flying objects during space travel; in this connection, one or more propulsion units can be provided which are arranged transversely relative to the longitudinal axis of the flying object and which are ignited individually at prescribed points in time in order to be able to carry out the desired path correction.

Solid propulsion units are often used for path correction, whereby one propulsion unit is required for each of the correction impulses, which are to be imparted repeatedly, so that a number of solid propulsion units have to be provided in the flying object with a correspondingly large mass and correspondingly large incorporated volumes. In order to carry out the actual control of the transverse thrust, the gas stream has to be controlled by hot gas valves and this requires expensive actuation devices.

A propulsion unit for the path correction of flying objects during space travel is known from EP-A 522,270, which comprises a housing, which is constructed as an anode and forms the expansion nozzle, and a rod-shaped, electrically insulating cathode which is held centrally therein. The cathode is arranged in a combustion chamber into which the propellent gases are injected, the tip of the cathode being separated from the narrow cross section of the throat of the nozzle via a small air gap. An arc is ignited between the anode and the cathode when gas is flowing through and the propellent gases are able to absorb additional thermal energy from the arc. A portion of the propellent gas is injected into the combustion chamber via a central hole which is arranged in the cathode. The cathode tip, which is located opposite the throat of the nozzle, is formed from an insert comprising tungsten. The propellent gas is generally a mixture comprising a ammonia, nitrogen gas and hydrogen gas and is produced by the thermal and/or catalytic decomposition of hydrazine ($N_2 N_4$) and initially has a temperature of the order of 500 to 600° C. upon its entry into the combustion chamber and is heated to temperatures of 10,000 to 14,000° C. in the arc before it leaves the expansion nozzle and produces the desired transverse thrust.

Because of the concentration of the arc stream in a comparatively narrow region, especially in the region of the cathode tip, such a propulsion unit is thermal stressed to an extraordinarily intense degree, especially in the region of the cathode. This adversely affects the working life of such a propulsion unit.

The use of monergols, e.g. hydrazine, as a propellent substance for a flying object, especially a satellite, is known from DE-A 2,537,543. In this connection, the term monergol is to be understood to mean a liquid propellent substance which generates a gas via decomposition as a result of its intrinsic conversion, without the addition of any further substance, due to an appropriate energy input, whereby this gas can be used to subject the propellent substance to pressure.

The use of a pyrotechnic gas generator for the purpose of steering flying objects or end-phase guided missiles is known from DE-A 3,616,184, in which a propellent charge is converted to gas in a combustion chamber and this gas is fed to control nozzles when a steering correction is required. The mode of operation of this known gas generator which is usable for control purposes is possible within the combustion chamber only under conditions of constant pressure, so that excess pressure peaks are to be avoided in particular. This can be achieved by means of mechanical excess-pressure valves which essentially comprise a spring/mass system and which consume a large amount of space so that they can no longer be arranged in the immediate vicinity of the combustion chamber, especially in end-phase guided missiles. In addition, mechanical excess-pressure valves exhibit poor response characteristics because of the relatively large time constants of the spring/mass system and these do not meet the requirements that are required in practice. Moreover, the opening and closing characteristics of conventional mechanical excess-pressure valves are associated with excessively large tolerances which exclude their use in precision steering arrangements. In order to avoid these disadvantages, this reference provides a pressure sensor in the combustion chamber which is connected to an electronic circuit on the outlet side in order to determine the specification pressure, which depends on the temperature and the prescribed combustion velocity of the propellent composition, and a temperature sensor of the propulsion composition which is connected to the electronic circuit, along with an adjusting element which opens the combustion chamber to dissipate the pressure peak in the event of sensing a pressure in the combustion chamber which exceeds the specification pressure.

SUMMARY OF THE INVENTION

The main object of the present invention is to provide an especially simple and rapidly responding process for the production of a transverse thrust in a flying object, in which a thrust of high impulse force can be produced by the process in a short time and in a defined direction.

In accordance with the above and further objects, the invention provides a process for the production of a transverse thrust in a flying object in which a defined quantity of a monergol propellent substance is introduced into a propulsion unit, which is arranged transversely relative to a longitudinal axis of the flying object to produce a thrust transverse to said longitudinal axis of the flying object, the propulsion unit having a combustion chamber, a supersonic nozzle connected to the combustion chamber and a source of heat to combust the propellant and produce the desired thrust for a prescribed time. The process comprises the steps of introducing a monergol propellent substance tangentially into an inlet in the combustion chamber to form a film of the propellent substance on an inside surface of a wall of the combustion chamber. Combustion of the film of propellent substance on said wall is effected by a pyrotechnic source of heat which is arranged in said wall of the combustion chamber in the vicinity of a throat of the supersonic nozzle. Hot gases produced by the combustion of the propellant substance produce a high pressure of 500 to 800 bars in the combustion chamber, and produce said transverse thrust in the supersonic nozzle. In accordance with the process the propellent substance is supplied to the combustion chamber through an inlet line extending tangentially to said combustion chamber and supply of the propellent substance to the combustion chamber is obtained by a valve. The high pressure in the combustion chamber is prevented from reaching said valve by connecting an outlet line from the combustion chamber to said inlet line at a location between said valve and said inlet of the combustion chamber, said outlet line being joined to the inlet line to merge therewith at a relatively small angle so as to be substantially parallel thereto. In this way, the pressure component of the combusted monergol at the connection of the outlet line to the inlet line can substantially equalize the pressure at the inlet of the combustion chamber and thus serve as a non-return valve which prevents the high pressure in the combustion chamber from reaching the inlet valve.

BRIEF DESCRIPTION OF THE DRAWINGS

The invention will be described in more detail in the following section with reference to the drawings in which the individual steps of the process are illustrated with respect to a propulsion unit which produces a transverse thrust. In the drawings.

DETAILED DESCRIPTION

Figure 1:
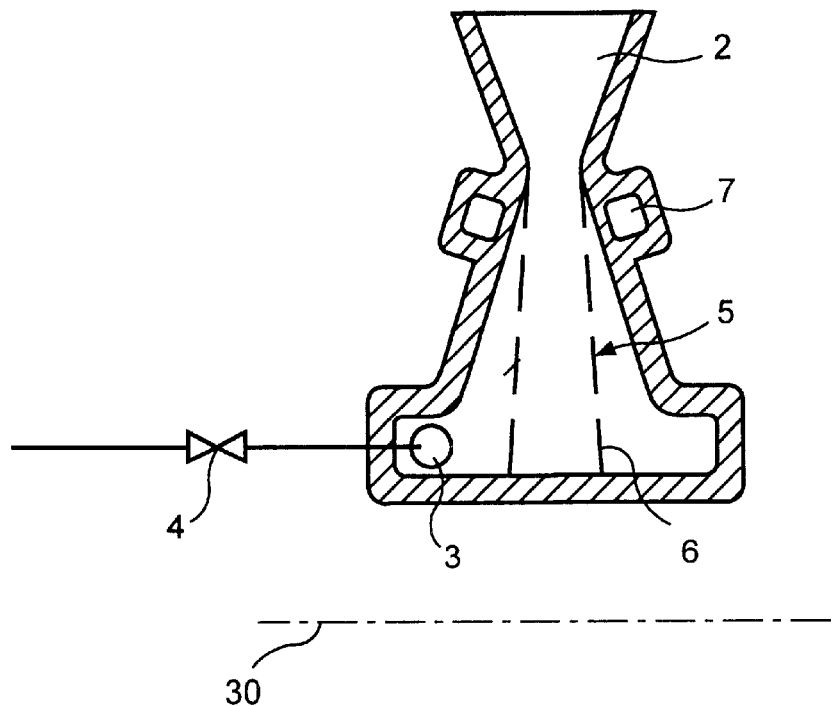
FIG. 1 is a section through a controllable transverse thrust propulsion unit in accordance with the invention.

In the various Figures of the drawing, identical parts are designated by the same reference numerals. The drawings show a propulsion unit having a combustion chamber 1, which serves for the production of a high pressure gas. The combustion chamber 1 has a cross section which decreases in the direction of a subsequent supersonic nozzle 2 whose cross section, in turn, increases in a conventional manner starting from the connection of its throat to the combustion chamber 1.

A propellant substance, such as a monergol is supplied through an inlet line 20 to an inlet 3 of the combustion chamber 1. The propellent substance is introduced tangentially into the combustion chamber 1. The flow of the propellant substance in inlet line 20 is controlled by means of an electromagnetic valve 4. A film 5 of propellent substance, is formed on the inside surface of the wall of the combustion chamber as a result of the tangential introduction of the monergol into the combustion chamber 1. The surface of this film is indicated by numeral 6. The thickness of the propellent film 5 in the combustion chamber 1 is a function of the shape of the wall of the combustion chamber 1 and the speed and duration of the introduction of the propellent substance.

A pyrotechnic source of heat 7, which is well known to those skilled in the art, is provided in an annular cavity in the wall of the combustion chamber 1 in the region of the throat of the supersonic nozzle 2. This source of heat ensures that the quantity of monergol, which is introduced into the combustion chamber 1, is combusted such that hot gases are produced at a high pressure of approximately 500 to 800 bar and which, during expansion of the gases, produce a correspondingly high thrust in the supersonic nozzle 2. The source of heat can be other than pyrotechnic as long as it is capable of combusting the propellant substance and producing the above indicated pressure.

Figure 2:
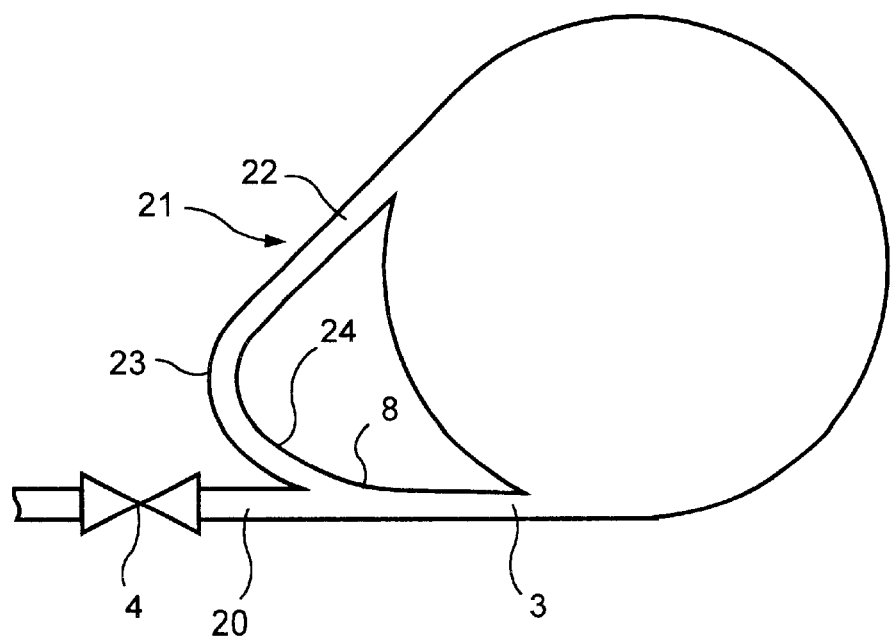
FIG. 2 is an enlarged illustration of the input of the propellent substance into the propulsion unit.
Figure 2A:
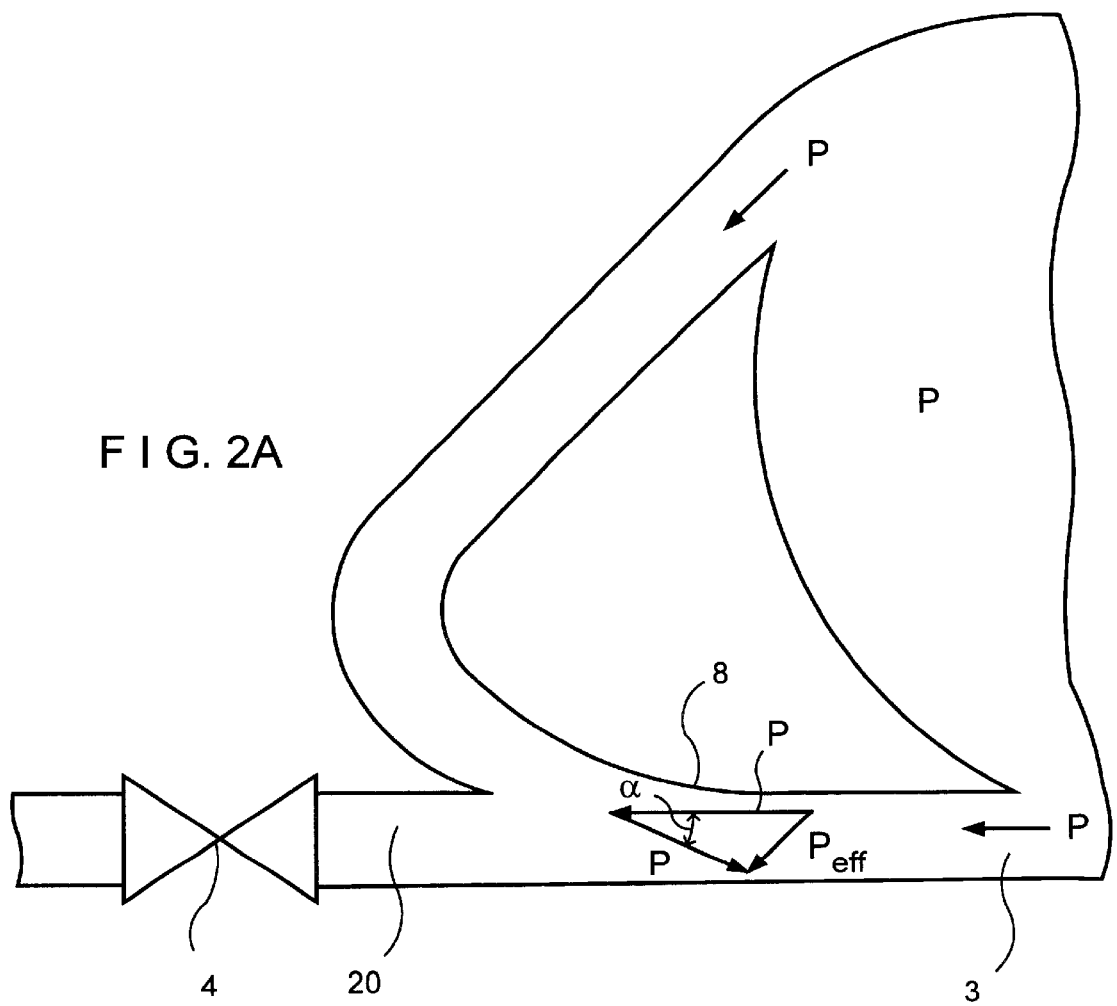
FIG. 2A is an enlarged view of a portion of FIG. 2 showing vectors representing pressure forces.

The propulsion unit, consisting of the combustion chamber 1 and the supersonic nozzle 2, is arranged perpendicularly to the longitudinal axis 30 of the flying object. A defined quantity of monergol propellent substance is introduced into the inlet line 20 by the electromagnetic valve 4, tangentially into the combustion chamber at inlet 3. The film 5 of propellent substance which is produced as a result of the inlet of propellant substance, reaches the pyrotechnic heat source 7, which is accommodated in the cavity in the wall of the combustion chamber, and, as a result of this, spontaneous combustion of the entire propellent substance, present in the combustion chamber, is initiated. The inlet 3 of combustion chamber 1 is sealed off from inlet valve 4 by a fluid non-return valve 8 during the time in which high pressure prevails in the combustion chamber 1. The non-return valve 8 is constructed without any moving parts and it operates so that the high pressure which is in the combustion chamber does not reach the valve 4. This is achieved by counter-balancing the pressure prevailing at inlet 3 with back pressure from the combustion chamber 1. In this way, the high pressure which prevails in the combustion chamber 1 will not reach the valve 4. In order to achieve this counter-balancing pressure, a separate back pressure line 21 is provided which connects the combustion chamber 1 with the inlet line 20. The line 21 includes a straight portion 22 which extends tangentially from the combustion chamber and merges with a reverse bend portion 23 that connects to a portion 24 merging with inlet line 20 at a relatively small, acute angle α shown on the vector diagram illustrated in FIG. 2A. From the vector diagram it is seen that a pressure component P is introduced into line 20 opposite in direction to the pressure P prevailing at the inlet 3. As a result, the back pressure line serves as the non-return valve 8 without any moving parts by providing substantial counter pressure in inlet line 20. During the generation of high pressure in the chamber 1, the high pressure is transferred by line 21 to the inlet line 20 to neutralize the pressure prevailing at inlet 3. In this way, the problems associated with mechanical non-return valves are avoided. In operation, the valve 4 can remain open during the entire period in which the thrust force is produced and no switching or closure of valve 4 is necessary. During the ongoing combustion of the propellent substance, the pressure level in the combustion chamber is progressively lowered as the combustion gases exit through the nozzle 2 and finally, no further thrust is produced and the pressure in the combustion falls below the feed pressure at valve 4 so that the combustion chamber will be refilled automatically and the process is repeated until the valve 4 is closed to end the entire process. The combustion chamber thus produces high thrust pulses with low chamber volume of about 500 cubic centimeters whereas in conventional thrust chambers, the volumes are about 20,000 cubic centimeters. It is a significant advantage of the invention that only opening and closing action of valve 4 is necessary at the very beginning and the very end of the process and during the period of the production of overall thrust the operation is controlled automatically as a result of the construction of the combustion chamber and the flow channels and the position of the heat source.

In this way, the electromagnetic control valve 4 is subjected only to the low pressure which is required for the input of the monergol.

The operation of the pyrotechnic heat source 7 is maintained continuously from the start of the generation of the transverse thrust to the end, whereas release for the input of the propellent substance into the combustion chamber 1 takes place only in response to the demand for the transverse thrust.

Figure 3:
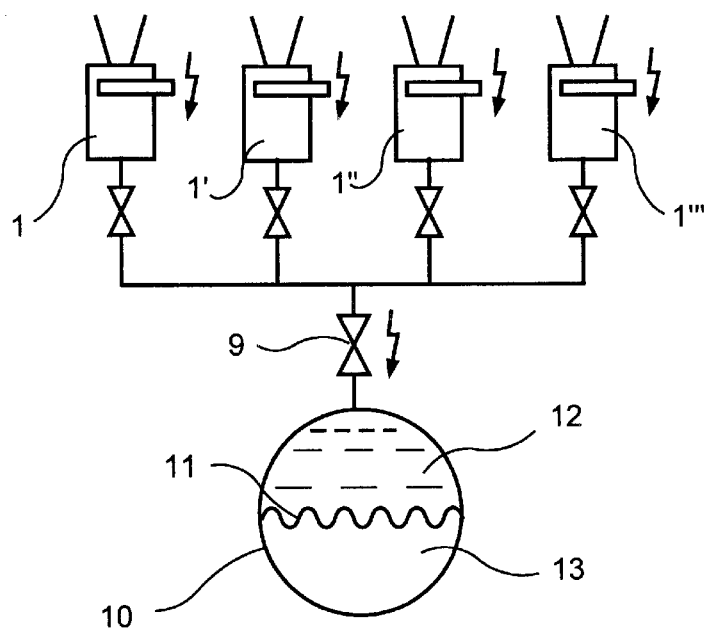
FIG. 3 is an illustration of the principle of transverse thrust control with four transverse thrust propulsion units.

FIG. 3 schematically shows the arrangement of four such transverse thrust units in a flying object, in which these units are connected to a common supply vessel 10 for the monergol propellent substance. The vessel 10 is subdivided into two chambers by a metal membrane 11 so that one chamber is filled with gas 13 under pressure which acts upon the monergol propellent substance, that is in the other chamber 12, in the direction of the four transverse thrust propulsion units 1, 1', 1", 1"', whereby the connecting line between the supply vessel 10 and the individual control valves for the four propulsion units is provided with a pyro-valve 9.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A process for the production of a transverse thrust in a flying object in which a defined quantity of a monergol propellent substance is introduced into a propulsion unit, which is arranged transversely relative to a longitudinal axis of the flying object to produce a thrust transverse to said longitudinal axis of the flying object, the propulsion unit having a combustion chamber, a supersonic nozzle connected to the combustion chamber and a source of heat to decompose the propellant and produce the thrust for a prescribed time, said process comprising the steps of:

introducing the monergol propellent substance, tangentially into the combustion chamber to form a film of the propellent substance on an inside surface of a wall of the combustion chamber;

combusting the film of propellent substance on said wall by a source of heat which is arranged in said wall of the combustion chamber in the vicinity of a throat of the supersonic nozzle;

producing hot gases by the combustion of the propellant substance to produce a high pressure of 500 to 800 bars in the combustion chamber, and producing said transverse thrust in the supersonic nozzle by directing said hot gases into the supersonic nozzle;

said process further comprising:
      supplying the propellent substance to the combustion chamber by an inlet line extending tangentially to said chamber,
      controlling supply of the propellent substance to the combustion chamber by a valve, and
      preventing the high pressure in the combustion chamber from reaching said valve by connecting a line from the combustion chamber to said inlet line at an intersection downstream of said valve at an angle having a component extending towards said combustion chamber.

2. The process as claimed in claim 1, wherein the propellant substance in the line connecting the combustion chamber and said inlet line flows into said inlet line back towards the combustion chamber to act as a non-return valve, said inlet valve remaining open during combustion of the propellent substance.

3. The process as claimed in claim 2, comprising forming said line connecting the combustion chamber and said inlet line with a first portion extending tangentially from said combustion chamber, a second bend portion extending from bend portion and a third portion connected to said inlet line at an acute angle thereto.

4. A process as claimed in claim 1, wherein the source of heat continuously produces heat from the start of combustion to the end thereof.

5. The process as claimed in claim 1, wherein said combustion of said propellent substance takes place in a space within said combustion chamber and said source of heat is located in said wall outside said space.

6. The process as claimed in claim 5, comprising arranging said source of heat annularly in said wall.

7. A process for the production of a transverse thrust in a flying object in which a defined quantity of a monergol propellent substance is introduced into a propulsion unit, which is arranged transversely relative to a longitudinal axis of the flying object to produce a thrust transverse to said longitudinal axis of the flying object, the propulsion unit having a combustion chamber, a supersonic nozzle connected to the combustion chamber and a source of heat to decompose the propellant and produce the thrust for a prescribed time, said process comprising the steps of:

introducing the monergol propellent substance, tangentially into the combustion chamber to form a film of the propellent substance on an inside surface of a wall of the combustion chamber;

combusting the film of propellent substance on said wall by a source of heat which is arranged in said wall of the combustion chamber in the vicinity of a throat of the supersonic nozzle;

producing hot gases by the combustion of the propellant substance to produce a high pressure of 500 to 800 bars in the combustion chamber, and producing said transverse thrust in the supersonic nozzle by directing said hot gases into the supersonic nozzle;

said process further comprising:
      supplying the propellent substance to the combustion chamber by an inlet line extending tangentially to said chamber,
      controlling supply of the propellent substance to the combustion chamber by a valve, and
      preventing the high pressure in the combustion chamber from reaching said valve by a non-return valve in said inlet line having no moving parts.

8. The process as claimed in claim 7, wherein said non-return valve is formed by connecting a return line form said combustion chamber to said inlet line at a location downstream from said inlet valve, the return line being an end forming a small acute angle with said inlet line and extending towards said combustion chamber.

9. The process as claimed in claim 8, wherein said inlet valve is open, said heat source produces combustion of the propellant substance and discharge of combustion gases through said nozzle while said non-return valve automatically blocks entry of the propellant substance into the combustion chamber and after discharge of said combustion gases, the open inlet valve re-admits propellant substance into the combustion chamber to repeat the process until said inlet valve is closed.

10. A propulsion unit of a transverse thrust in a flying object said propulsion unit comprising:
   an inlet line for a propellant substance;
   a valve for controlling flow of propellant into said inlet line;
   a combustion chamber, said inlet line being connected tangentially to said combustion chamber to supply the propellant substance thereto as a film on an inside surface of a wall of the combustion chamber, a heat source in said wall to combustion the film of propellant substance in the combustion chamber to produce high pressure gasses, a nozzle connected to said combustion chamber and extending transversely of a longitudinal axis of the flying object to produce transverse thrust on the flying object, and a non-return valve assembly for preventing backflow of the high pressure gases through said inlet line to said valve, said non-return valve assembly comprising a backflow line having one end connected to said combustion chamber and an opposite end connected to said inlet line downstream of said inlet valve, said backflow line being connected to said inlet line at a small acute angle facing in the direction of said combustion chamber.

11. A propulsion unit as claim in claim 10, wherein said backflow line connects tangentially to said combustion chamber.

12. A propulsion unit as claim in claim 10, wherein said nozzle has a throat connected to said combustion chamber, said heat source being located in the vicinity of said throat.

* * * * *

UNITED STATES PATENT AND TRADEMARK OFFICE
CERTIFICATE OF CORRECTION

PATENT NO.     : 6,519,928 B2
DATED          : February 18, 2003
INVENTOR(S)    : German Munding et al.

It is certified that error appears in the above-identified patent and that said Letters Patent is hereby corrected as shown below:

<u>Title page,</u>
Item [73], Assignee, "Strium" should read -- Astrium --
Item [*], Notice, "26" should read -- 86 --.

Signed and Sealed this

Twenty-fourth Day of June, 2003

JAMES E. ROGAN
*Director of the United States Patent and Trademark Office*